US012614433B2

(12) United States Patent
Trivedi et al.

(10) Patent No.: US 12,614,433 B2
(45) Date of Patent: Apr. 28, 2026

(54) METHOD FOR IDENTIFYING AND HIGHLIGHTING METERS WITHIN A MULTIPHASE PRODUCTION FLOW

(71) Applicant: Schlumberger Technology Corporation, Sugar Land, TX (US)

(72) Inventors: Anubhav Trivedi, Pune (IN); Madhuri Agrawal, Pune (IN); Rajeev Bishwambar Panda, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/225,182

(22) Filed: Jun. 2, 2025

(65) Prior Publication Data

US 2025/0391253 A1      Dec. 25, 2025

(30) Foreign Application Priority Data

Jun. 19, 2024    (IN) .............................. 202411047089

(51) Int. Cl.
| | |
|---|---|
| *G08B 5/22* | (2006.01) |
| *E21B 41/00* | (2006.01) |
| *G06F 9/451* | (2018.01) |
| *G06F 9/54* | (2006.01) |

(52) U.S. Cl.
CPC ................ *G08B 5/22* (2013.01); *E21B 41/00* (2013.01); *G06F 9/451* (2018.02); *G06F 9/544* (2013.01); *G06F 2209/545* (2013.01)

(58) Field of Classification Search
CPC ........... G08B 5/22; G08B 21/18; E21B 41/00; G06F 9/451; G06F 9/544; G06F 2209/545
See application file for complete search history.

(56) References Cited

U.S. PATENT DOCUMENTS

| | | | | | |
|---|---|---|---|---|---|
| 5,821,742 | A | * | 10/1998 | Carr ........................ | G01R 35/04 |
| | | | | | 323/222 |
| 6,112,159 | A | * | 8/2000 | Bond ...................... | G01R 22/00 |
| | | | | | 702/65 |
| 6,233,322 | B1 | * | 5/2001 | Cannon ............. | H04M 3/53366 |
| | | | | | 379/88.08 |
| 7,091,878 | B2 | * | 8/2006 | Holle ................... | G01R 22/066 |
| | | | | | 340/637 |
| 2003/0080876 | A1 | * | 5/2003 | Martin ................... | G01D 4/004 |
| | | | | | 340/870.02 |
| 2003/0151415 | A1 | * | 8/2003 | Randall .................. | G01R 35/04 |
| | | | | | 324/601 |

(Continued)

*Primary Examiner* — Amine Benlagsir
(74) *Attorney, Agent, or Firm* — Michael Guthrie

(57) ABSTRACT

A method for prioritizing signals received from a plurality of meters disposed or distributed within a multiphase production workflow. The method includes receiving a plurality of signals from the plurality of meters and then assigning a priority value to the plurality of signals. The priority values are stored in a cache, the cache maintaining the priority values that have been assigned over a previous 24-hour period. The method also includes displaying the plurality of signals according to their respective priority values within a list, the signals having a higher priority value being displayed at a top portion of the list. The list is then updated with any newly received signals from the meters. A user may be sent a notification which includes the list of received signals. A wellsite action is then performed that is based on or in response to the received notification.

6 Claims, 5 Drawing Sheets

(56)        References Cited

U.S. PATENT DOCUMENTS

2004/0104808  A1 *   6/2004  Khoshbin  .............  G07F 7/0866
                                                        340/7.53
2005/0194962  A1 *   9/2005  Briese  ...................  G01D 4/002
                                                        324/142
2006/0103549  A1 *   5/2006  Hunt  ......................  G06Q 50/06
                                                        340/870.02
2006/0106741  A1 *   5/2006  Janarthanan  .......  G01R 21/1333
                                                        705/412
2006/0122925  A1 *   6/2006  Wesby  ...................  H04L 67/04
                                                        705/35
2006/0283965  A1 *  12/2006  Mueller  ..............  G05B 19/042
                                                        236/94
2008/0150677  A1 *   6/2008  Arakawa  ..................  E02F 9/24
                                                        340/5.2

* cited by examiner

SYSTEM 100

MANAGEMENT COMPONENTS 110

SEISMIC DATA 112

OTHER INFORMATION 114

PROCESSING 116

ENTITIES 122

SIMULATION 120

ATTRIBUTE 130

ANALYSIS/ VISUALIZATION 142

OTHER WORKFLOW 144

FRAMEWORK 170

MODULES 175

MODEL SIMULATION 180

FRAMEWORK SERVICES 190

FRAMEWORK CORE 195

DOMAIN OBJECTS 182

DATA SOURCE 184

RENDERING 186

USER INTERFACES 188

160

GEOLOGIC ENVIRONMENT
(E.G., SENSING, DRILLING, INJECTING, EXTRACTING, ETC.)
150

155
157
158
159
152
156
153-2
153-1
154
151

1000
0
1000
2000
3000
4000
5000

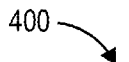

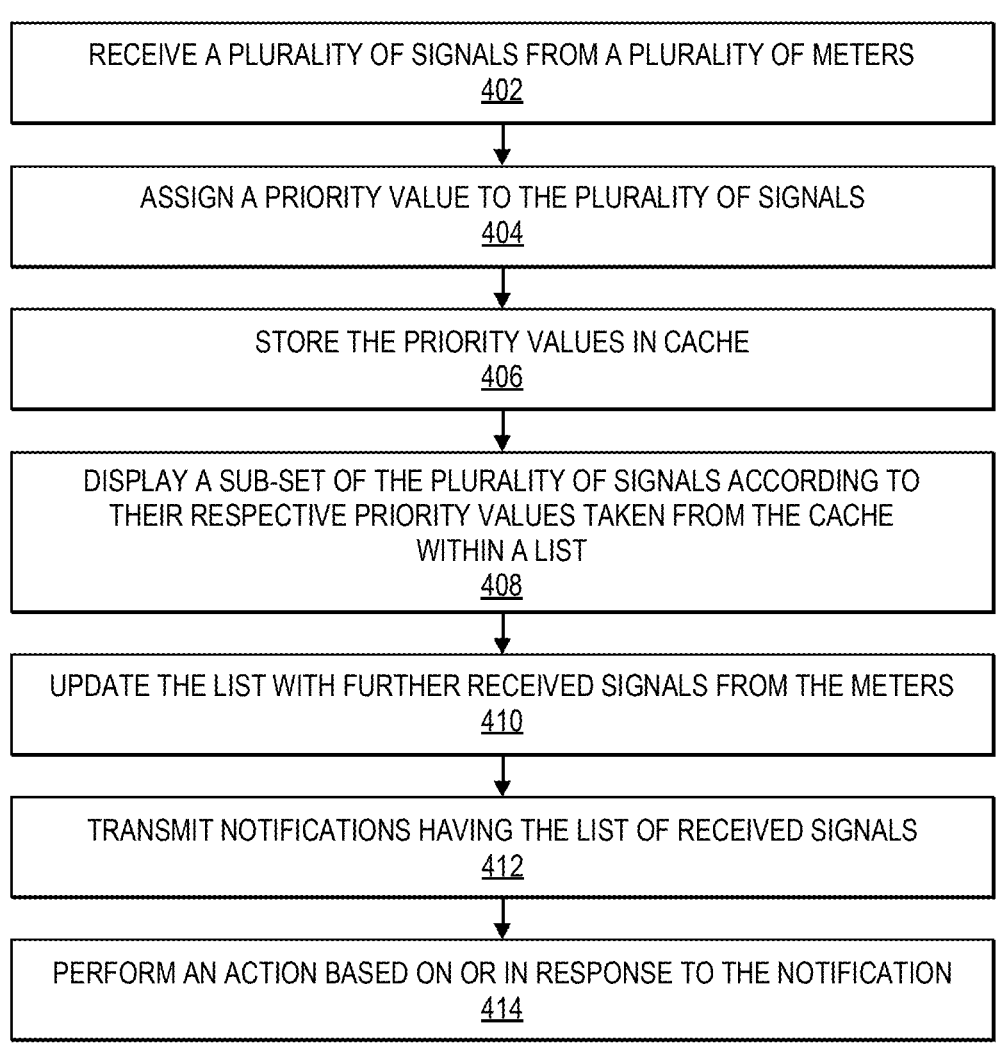

RECEIVE A PLURALITY OF SIGNALS FROM A PLURALITY OF METERS
402

ASSIGN A PRIORITY VALUE TO THE PLURALITY OF SIGNALS
404

STORE THE PRIORITY VALUES IN CACHE
406

DISPLAY A SUB-SET OF THE PLURALITY OF SIGNALS ACCORDING TO
THEIR RESPECTIVE PRIORITY VALUES TAKEN FROM THE CACHE
WITHIN A LIST
408

UPDATE THE LIST WITH FURTHER RECEIVED SIGNALS FROM THE METERS
410

TRANSMIT NOTIFICATIONS HAVING THE LIST OF RECEIVED SIGNALS
412

PERFORM AN ACTION BASED ON OR IN RESPONSE TO THE NOTIFICATION
414

FIG. 4

METHOD FOR IDENTIFYING AND HIGHLIGHTING METERS WITHIN A MULTIPHASE PRODUCTION FLOW

CROSS-REFERENCE TO RELATED APPLICATIONS

This patent application claims priority to Indian Provisional Application No. 202411047089, filed on Jun. 19, 2024, which is incorporated by reference herein in its entirety.

BACKGROUND

The oil and gas industry relies heavily on production monitoring systems to ensure the safe and efficient operation of facilities. Meters, such as Vx Spectra multiphase flowmeters, are used to monitor the real time data for crude oil flow, venturi differential pressure, temperature, and other similar or related parameters. Various sensors are configured as part of these meters which are used to transmit data containing crucial information about the meter to a user.

There is a need to proactively identify Vx meters requiring maintenance for ensuring reliable measurements. A robust system is needed which leverages existing alarms within the production monitoring system that are triggered by the Vx meters and which effectively interprets and prioritizes these alarms, thereby streamlining the process of identifying meters in need of attention.

SUMMARY

The current disclosure provides a method for prioritizing signals received from a plurality of meters disposed at a site. In certain embodiments, the method includes receiving a plurality of signals from the plurality of meters, assigning a priority value to each of the signals, and storing each of the priority values in a cache. A sub-set of the signals may then be displayed according to their corresponding priority values taken from the cache as a list on a display and a notification comprising the sub-set of signals and their corresponding priority values may then be transmitted to a user.

A computing system is further provide, the computing system including one or more processors and a memory system having one or more non-transitory computer-readable media storing instructions that, when executed by at least one of the one or more processors, cause the computing system to perform operations. The operations also include receiving a plurality of signals from a plurality of meters disposed at a site, assigning a priority value to a status event corresponding to each of the signals, and storing each of the priority values in a cache. The operations may also include displaying a sub-set of the status events according to their corresponding priority values taken from the cache as a list on a display, transmitting a notification comprising the list to a user, and performing a site action in response to the notification.

Also provided is a non-transitory computer-readable medium storing instructions that, when executed by one or more processors of a computing system, cause the computing system to perform operations. The operations include receiving a plurality of signals from a plurality of meters. Each signal may correspond with a status event that is detected by a corresponding one of the meters. The status event may relate to an alarm condition or an absence of incoming data being received from at least one meter. Each signal may include a tag value provided by at least one meter. The operations also include assigning a priority value to each of the signals. The absence of incoming data may be given a higher priority value than an alarm condition. The alarm condition may be identified by a 16-bit binary code converted from the tag value. The operations may also include storing each of the priority values in a cache. The cache may include any priority values assigned to any signals received over a previous 24-hour period. The operations also include displaying a sub-set of the signals according to their corresponding priority values taken from the cache as a list on a display. The signals assigned a high priority value may be displayed at a top portion of the list. Displaying the sub-set of the signals further may include displaying the meter that each signal originated from and the status event detected by the meter. The operations also include updating the cache with a further signal received from the meters. Updating the cache may include assigning a further priority value to the further signal and inserting the further signal into a position within the list according to its relative priority value. The operations also include transmitting a notification including the sub-set of signals and their corresponding priority values to a user. The notification may include a suggested action in response to each of the sub-set of signals. The notification may be transmitted twice to the user within a 24-hour period. The operations also include performing the suggested action in response to the notification. The suggested action may be a suggested wellsite action for each received signal. The wellsite action may include addressing the status event. The wellsite action may include generating or transmitting a signal that instructs or causes an action to occur. The action may include a physical action. The physical action may include selecting where to drill a wellbore in the subsurface formation, drilling the wellbore, monitoring wiring, replacing a sensor, replacing a temperature probe, adding a shelter or winterizing solution for extreme temperature conditions, varying a trajectory of the wellbore, varying a weight or torque on a drill bit that is drilling the wellbore, recalibrating at least one of the meters, varying a rate or concentration of a fluid being pumped into the wellbore, or a combination thereof.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 4 illustrates a flowchart of a method for prioritizing signals received from a plurality of meters disposed or distributed within a multiphase production workflow, according to an embodiment.

DETAILED DESCRIPTION

Figure 1:
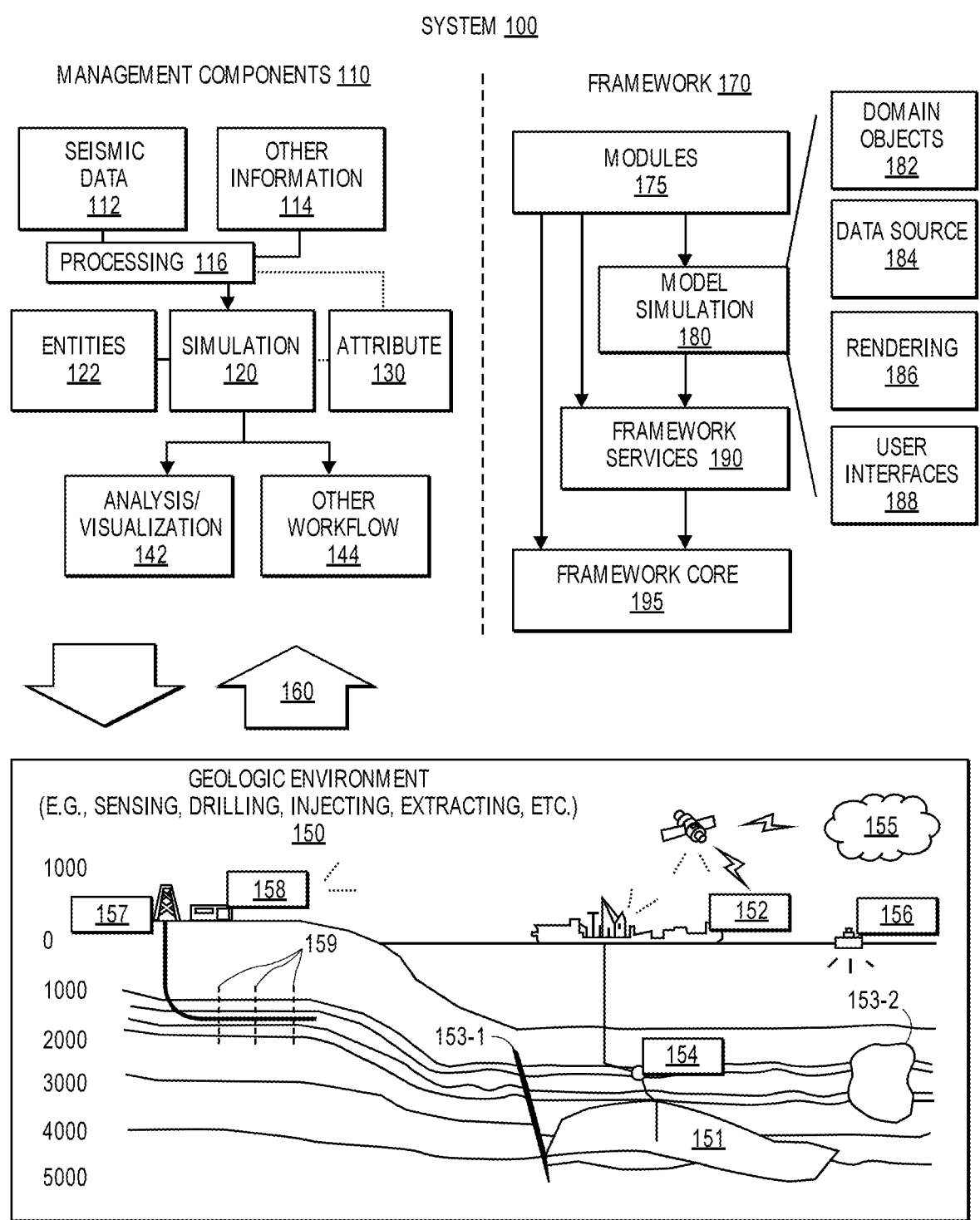
FIG. 1 illustrates an example of a system that includes various management components to manage various aspects of a geologic environment, according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

The present disclosure provides a method where meters within a production workflow transmit alarms through distinct Modbus channels. Each alarm may be represented as a numerical value. These numerical values are then converted into a 16-bit binary representation and meticulously mapped onto a matrix, with '1' indicating a triggered alarm and 'O' signifying an inactive or absent alarm. Priority values are assigned to each alarm, establishing a clear hierarchy where lower numbers displayed to a user corresponded to higher priority levels.

A record of alarms over a preceding 24 hours is stored in a Redis in-memory cache. The system gives precedence to meters with currently active high-priority alarms, ensuring their elevated ranking. Furthermore, offline meters are automatically accorded the highest priority, recognizing their potential impact on data accuracy.

In cases where a high-priority alarm is triggered within the last 24 hours, a refined ranking process is initiated between meters, factoring in the relative priority levels of the alarms already stored within the cache. Next, meters within the application interface related to the production workflow are highlighted based on their priority-driven ranking. This intuitive display empowers users to swiftly identify meters demanding attention, facilitating timely actions such as scheduling maintenance, recalibration, or reprovisioning.

System Overview

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
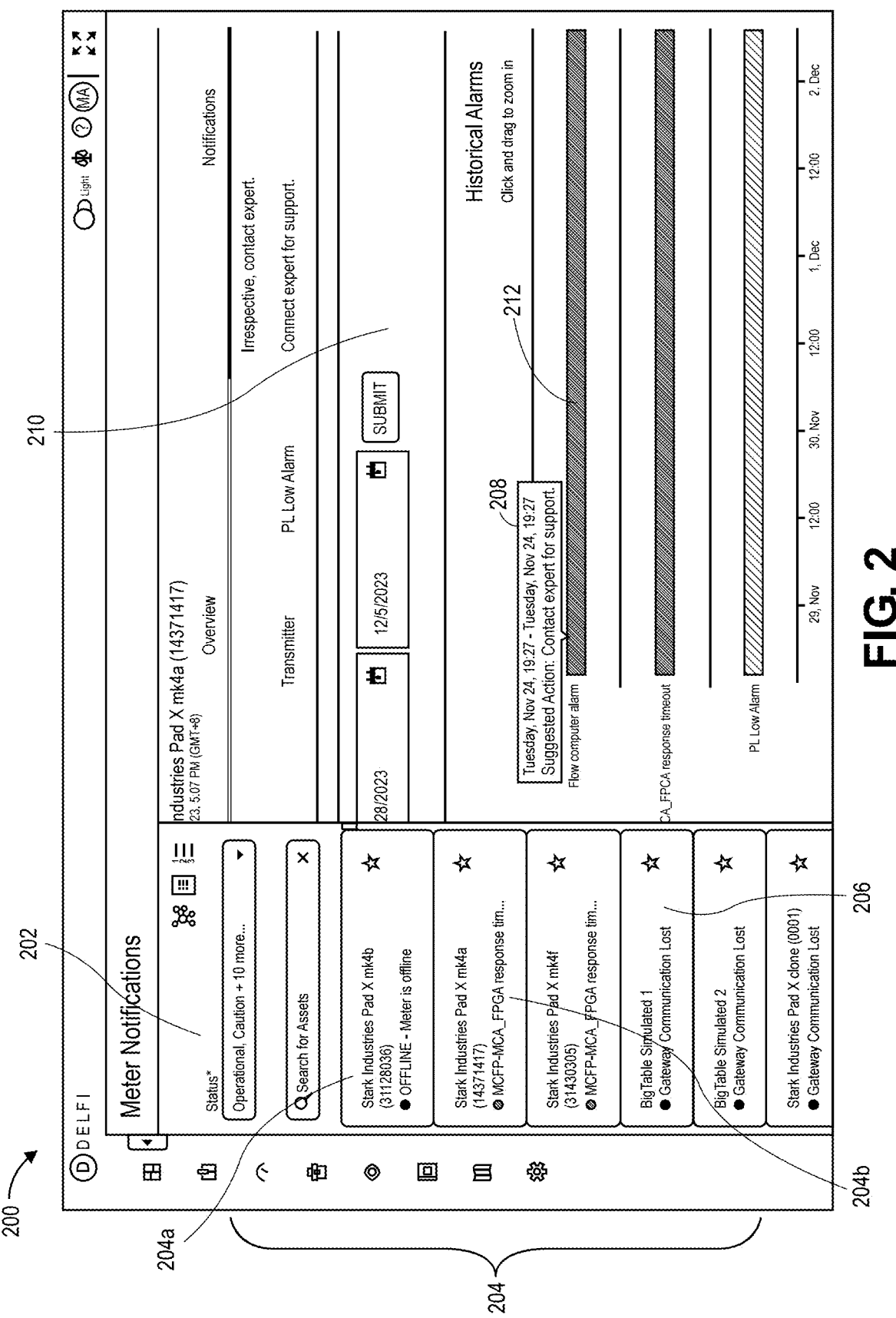
FIG. 2 illustrates an example of a user interface used to notify a user of status events associated with a plurality of meters within a multiphase production workflow, according to an embodiment.

Method for Identifying and Highlighting Meters Within a Multiphase Production Flow FIG. 2 is an example of a user interface 200 used to implement and manage the method of the present disclosure. The user interface 200 may be displayed or operated on at least one of the management components 110 seen in FIG. 1. In a left panel 202, a representation of a plurality of status events 204 may be displayed in a sorted order or list 206. Each of the status events 204 correspond to a meter, sensor, or other diagnostic component within a production workflow, for example the system 100 seen in FIG. 1. In certain embodiments, a status event corresponding to an offline meter 204*a* is shown on the top of the list 206, followed by status events corresponding to meters 204*b* which correspond to having a high priority alarm triggered. The user interface 200 may also include\ a suggested action 208 which corresponds to or relates a specific alarm for any status event 204 within the production workflow. According to certain embodiments, the user interface 200 includes a right panel 210, which when a user hovers over or otherwise selects on a graph 212 disposed within the right panel 210, the suggested action 208 is displayed.

According to certain embodiments, the use interface 200 is a rest API which may read tag values received from modbus channels corresponding to a meter or sensor every two minutes. The tag value may be decoded into a 16-bit binary representation which is then used to determine a current status event or alarm that is associated with the meter or sensor based on enabled bits from the tag value's binary representation. According to certain embodiments, a record of the status event is stored in a redis cache. The highest alarm within the last 24 hours as determined by its relative ranking may be pulled from redis cache and stored in a datastore for all the meters within the production workflow. This process can be used by any other application within the system 100 with some configuration changes like channels for which alarm should be triggered, bits which notify some problem, and prioritization. According to certain embodiments, the user interface 200 can be designed as per the application need.

According to certain embodiments, the user interface 200 may be configured such that whenever a new meter is added to the production workflow, the user interface 200 will automatically incorporate a representation of any new status events 204 associated with the newly added meter into the ranked list 206. According to certain embodiments, no user input is needed to specifically add meters newly added to the production workflow to the user interface 200. The user interface 200 may be used by or incorporated into any other application or program stored or running on the management components 110 of the system 100, specifically any application which monitors equipment and prioritizes items which need to be taken care of or addressed immediately. According to certain embodiments, the status event 204 with the highest priority ranking assigned to it within the last 24 hour period will be updated in the cache along with an identification of the meter that the status event 204 corresponds to. According to certain embodiments, the representation of the status events 204 may be displayed in the user interface 200 in any format.

With the user interface 200, the number of field visits to the production workflow may be reduced. Engineers or other users may not visit the physical location of the meter or sensor within the production workflow every time to see whether it is functioning properly or not. Instead, this can be monitored through the user interface 200. According to certain embodiments, the status events 204 that correspond to an alarm or other status of the meter within the production workflow is updated every minute within the user interface 200 without refreshing the page externally.

Figure 3:
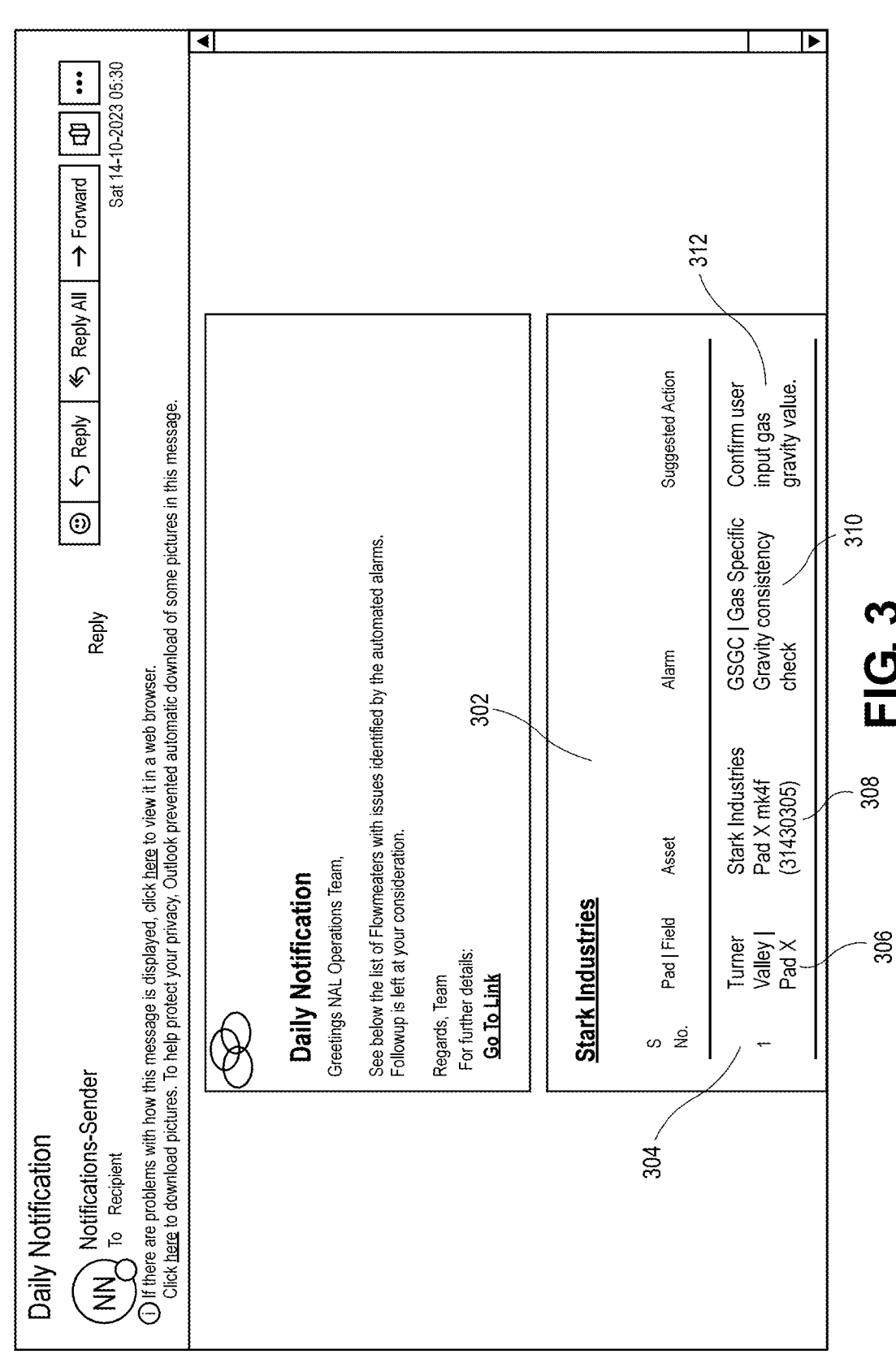
FIG. 3 illustrates an example of a notification sent to a user, the notification including a listing of status events associated with a plurality of meters within a multiphase production workflow, according to an embodiment.

FIG. 3 illustrates an example of a notification 300 generated by the user interface 200 upon the detection of a status event. In certain embodiments, the notification 300 includes a listing 302 of alarms or other issues relating to the meters, sensors, or other assets within the production workflow. According to certain embodiments, the listing 302 includes a rank or priority 304, a general location 306 of the meter or sensor, an identification 308 of the type of equipment that the meter or sensor relates to, a description 310 of the status event within the production workflow, and a suggested action 312 in response to the status event. According to certain embodiments, at least two daily notifications 300 are generated and transmitted to the user, each of the notifications 300 displaying the status events 204 in prioritized order.

Exemplary Method

FIG. 4 illustrates a flowchart of a method 400 for prioritizing signals received from a plurality of meters disposed or distributed within a multiphase production workflow, according to an embodiment. An illustrative order of the method 400 is provided below, however, one or more portions of the method 400 may be performed in a different order, simultaneously, repeated, or omitted. At least a portion of the method 400 may be performed by a computing system.

The method 400 may include receiving a plurality of signals from a plurality of meters disposed at the site, as at 402. Each received signal may be associated or correspond with a status event that is detected by the corresponding meter. In certain embodiments, the status event relates to an alarm condition or to an absence of incoming data being received from at least one of the meters. Each received signal may include a tag value that is provided by the corresponding meter, according to certain embodiments.

The method 400 may also include assigning a priority value to the plurality of signals, as at 404. According to certain embodiments, the absence of incoming data may be given a higher priority value than alarm conditions. The type or nature of the alarm is identified by a 16-bit binary code converted from the tag value, according to certain embodiments.

The method 400 may also include storing each of the priority values in a cache, as at 406. According to certain embodiments, the cache includes the priority values that have been assigned to any signal that have been received over a previous 24-hour period.

The method 400 may also include displaying a sub-set of the plurality of signals according to their respective priority values taken from the cache as a list on display, as at 408. An example of this is shown in FIG. 2. In some embodiments, the signals having a high priority value may be displayed at a top portion of the list. Displaying the plurality of signals may also include specifically displaying the meter that the signal originated from, or the status event detected by the meter.

The method 400 may also include updating the list with a newly or further received signal from the meters, as at 410. The further received signal may be from a pre-existing or previously implemented meter or sensor, or it may be from a new meter or sensor that is introduced or installed at the site. The newly received signal includes an assigned priority value and is then inserted into a position within the list according to its relative priority value.

The method 400 may also include transmitting a notification comprising the list of received signals to a user, as at 412. An example of this is shown in FIG. 3. According to certain embodiments, the list of received signals may be displayed within the notification on a screen. The list of received signals may be transmitted to the user, and in certain embodiments, the notification includes a suggested action which in response to the received signals. The notification may be transmitted twice within a 24-hour period, according to certain embodiments.

Figure 5:
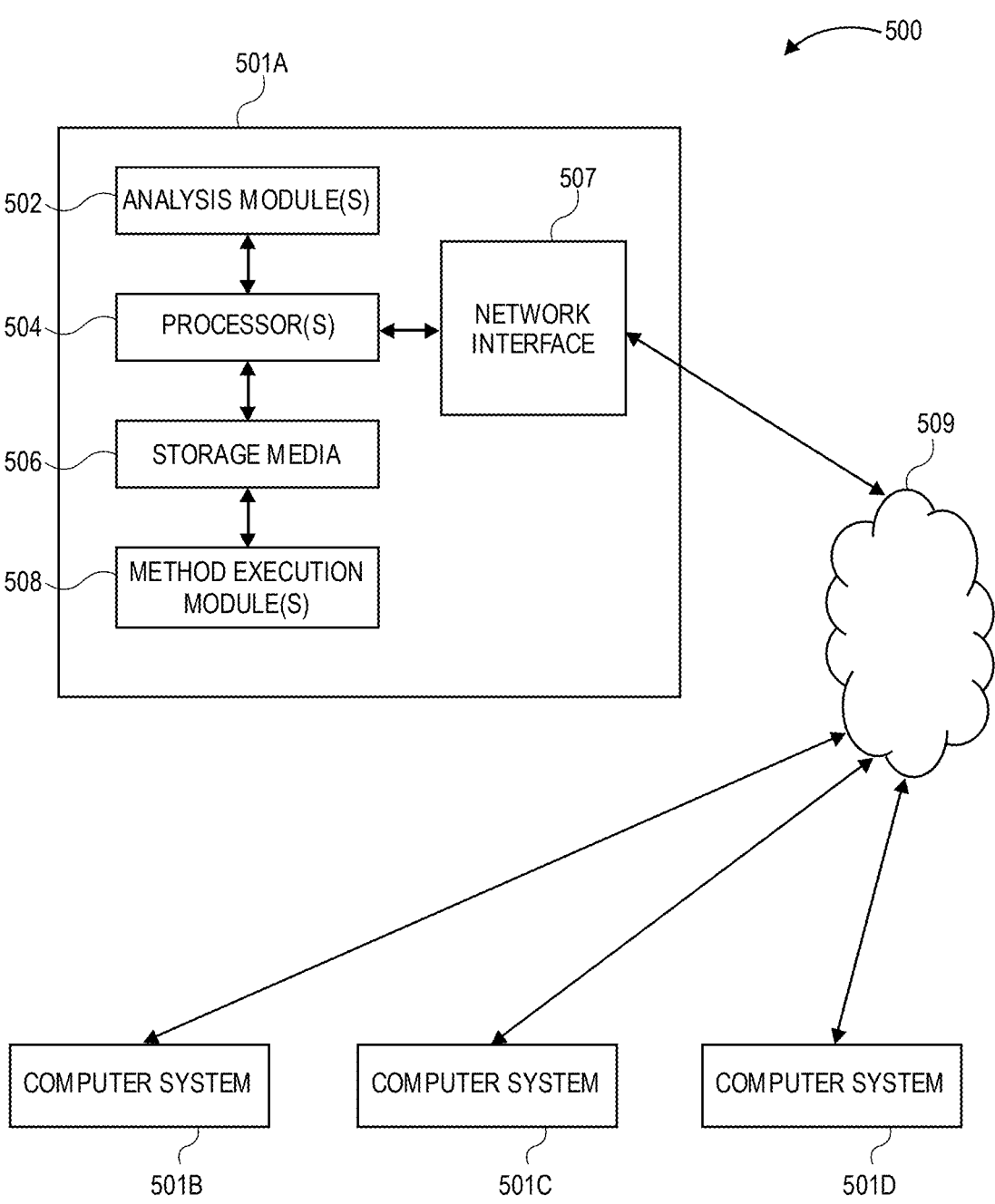
FIG. 5 illustrates a schematic view of a computing system for performing at least a portion of the method(s) described herein, according to an embodiment.

The method 400 may also include performing a site action based on or in response to the notification, as at 414. The site action may be the suggested action displayed within the notification and may be or include generating and/or transmitting a signal (e.g., using a computing system) that instructs or causes a physical action to occur at a wellsite. The action may also or instead include performing a physical action at the wellsite. The physical action may include selecting where to drill a wellbore, drilling the wellbore, varying a weight and/or torque on a drill bit that is drilling the wellbore, varying a drilling trajectory of the wellbore, recalibrating at least one of the meters, monitoring wiring, replacing a sensor, replacing a temperature probe, adding a shelter or winterizing solution for extreme temperature conditions, varying a concentration and/or flow rate of a fluid pumped into the wellbore, or a combination thereof.
Exemplary Computing System In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are)

also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

In some embodiments, computing system 500 contains one or more method execution module(s) 508. In the example of computing system 500, computer system 501A includes the method execution module 508. In some embodiments, a single method execution module may be used to perform some aspects of one or more embodiments of the methods disclosed herein. In other embodiments, a plurality of method execution modules may be used to perform some aspects of methods herein.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purposes of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for prioritizing a plurality of signals received from a plurality of meters disposed at a site, the method comprising:

receiving the plurality of signals from the plurality of meters, wherein each signal corresponds with a status event detected by a corresponding one of the meters, wherein the status event relates to an alarm condition and an absence of incoming data being received from the corresponding one of the meters, and wherein each signal comprises a tag value provided by the corresponding one of the meters;

assigning a priority value of a plurality of priority values to each of the signals, wherein the absence of incoming data is given a higher priority value than the alarm condition, wherein the alarm condition is identified by a 16-bit binary code converted from the tag value;

storing each of the priority values in a cache, wherein the cache comprises the priority values assigned to the signals received over a previous 24-hour period;

displaying a sub-set of the signals according to their corresponding priority values taken from the cache as a list on a display, wherein high priority signals of the plurality of signals assigned high priority values are displayed at a top portion of the list, wherein displaying the sub-set of the signals further comprises displaying the meters with each signal originated from and the status event detected by the corresponding one of the meters;

updating the cache with a further signal received from the meters, wherein updating the cache comprises assigning a further priority value to the further signal and inserting the further signal into a position within the list according to its relative priority value from the priority values;

transmitting a notification to a user comprising the sub-set of the signals and their corresponding priority values to the user, wherein the notification comprises a suggested action in response to each signal of the sub-set of the signals, and wherein the notification is transmitted twice to the user within a 24-hour period; and performing the suggested action in response to the notification, wherein the suggested action is a suggested wellsite action for each received signal of the received plurality of signals, wherein the suggested wellsite action comprises addressing the status event, wherein the suggested wellsite action comprises generating and transmitting each signal that instructs and causes an action to occur, wherein the action comprises a physical action, and wherein the physical action comprises at least one of selecting where to drill a wellbore in a subsurface formation, drilling the wellbore, varying a trajectory of the wellbore, varying a weight or torque on a drill bit that is drilling the wellbore, recalibrating at least one of the meters, monitoring wiring, replacing a sensor, replacing a temperature probe, adding a shelter and winterizing solution for extreme temperature conditions, and varying a rate or concentration of a fluid being pumped into the wellbore.

2. The method of claim 1, wherein said transmitting the notification to the user comprises transmitting the notification to a screen associated with the user.

3. A computing system, comprising:

one or more processors; and a memory system comprising one or more non-transitory computer-readable media storing instructions that, when executed by at least one of the one or more processors, cause the computing system to perform operations, the operations comprising:

receiving a plurality of signals from a plurality of meters disposed at a site, wherein each signal corresponds with a status event detected by a corresponding one of the meters, wherein the status event relates to an alarm condition and an absence of incoming data being received from the corresponding one of the meters, and wherein each signal comprises a tag value provided by the corresponding one of the meters;

assigning a priority value of a plurality of priority values to the status event corresponding to each of the signals, wherein the absence of incoming data is given a higher priority value than the alarm condition, wherein the alarm condition is identified by a 16-bit binary code converted from the tag value;

storing each of the priority values in a cache, wherein the cache comprises the priority values assigned to the signals received over a previous 24-hour period;

displaying a sub-set of the signals according to their corresponding priority values taken from the cache as a list on a display, wherein high priority signals of the plurality of signals assigned high priority values are displayed at a top portion of the list, wherein displaying the sub-set of the signals further comprises displaying the meters with each signal originated from and the status event detected by the corresponding one of the meters;

updating the cache with a further signal received from the meters, wherein updating the cache comprises assigning a further priority value to the further signal and inserting the further signal into a position within the list according to its relative priority value from the priority values;

transmitting a notification comprising the list of the sub-set of the signals according to their corresponding priority values to a user, wherein the notification comprises a suggested action in response to each signal of the sub-set of the signals, and wherein the notification is transmitted twice to the user within a 24-hour period; and performing a site action in response to the notification, wherein the suggested action is a suggested wellsite action for each received signal of the received plurality of signals, wherein the suggested wellsite action comprises addressing the status event, wherein the suggested wellsite action comprises generating and transmitting each signal that instructs and causes an action to occur, wherein the action comprises a physical action, and wherein the physical action comprises at least one of selecting where to drill a wellbore in a subsurface formation, drilling the wellbore, varying a trajectory of the wellbore, varying a weight or torque on a drill bit that is drilling the wellbore, recalibrating at least one of the meters, monitoring wiring, replacing a sensor, replacing a temperature probe, adding a shelter and winterizing solution for extreme temperature conditions, and varying a rate or concentration of a fluid being pumped into the wellbore.

4. The computing system of claim 3, wherein said displaying the sub-set of the signals according to their corresponding priority values comprises highlighting the status event corresponding to at least one of the signals.

5. The computing system of claim 3, wherein said displaying the sub-set of the signals comprises displaying the suggested action in response to the sub-set of the signals within the list.

6. A non-transitory computer-readable medium storing instructions that, when executed by one or more processors of a computing system, cause the computing system to perform operations, the operations comprising:

receiving a plurality of signals from a plurality of meters, wherein each signal corresponds with a status event detected by a corresponding one of the meters, wherein the status event relates to an alarm condition and an absence of incoming data being received from the corresponding one of the meters, and wherein each signal comprises a tag value provided by the corresponding one of the meters;

assigning a priority value of a plurality of priority values to each of the signals, wherein the absence of incoming data is given a higher priority value than the alarm condition, wherein the alarm condition is identified by a 16-bit binary code converted from the tag value;

storing each of the priority values in a cache, wherein the cache comprises the priority values assigned to the signals received over a previous 24-hour period;

displaying a sub-set of the signals according to their corresponding priority values taken from the cache as a list on a display, wherein high priority signals of the plurality of signals assigned a high priority value are displayed at a top portion of the list, wherein displaying the sub-set of the signals further comprises displaying the meters with each signal originated from, and the status event detected by the corresponding one of the meters;

updating the cache with a further signal received from the meters, wherein updating the cache comprises assigning a further priority value to the further signal and inserting the further signal into a position within the list according to its relative priority value;

transmitting a notification to a user comprising the sub-set of the signals and their corresponding priority values to the user, wherein the notification comprises a suggested action in response to each of the sub-set of the signals, and wherein the notification is transmitted twice to the user within a 24-hour period; and performing the suggested action in response to the notification, wherein the suggested action is a suggested wellsite action for each received signal of the received plurality of signals, wherein the wellsite action comprises addressing the status event, wherein the wellsite action comprises generating and transmitting each signal that instructs or causes an action to occur, wherein the action comprises a physical action, and wherein the physical action comprises at least one of selecting where to drill a wellbore in a subsurface formation, drilling the wellbore, varying a trajectory of the wellbore, varying a weight or torque on a drill bit that is drilling the wellbore, recalibrating at least one of the meters, monitoring wiring, replacing a sensor, replacing a temperature probe, adding a shelter and winterizing solution for extreme temperature conditions, and varying a rate or concentration of a fluid being pumped into the wellbore.

* * * * *